United States Patent
Horiuchi

(10) Patent No.: US 9,459,654 B2
(45) Date of Patent: Oct. 4, 2016

(54) SPEAKER MOUNTING STRUCTURE AND DISPLAY DEVICE

(71) Applicant: Funai Electric Co., Ltd., Daito-shi, Osaka (JP)

(72) Inventor: Yasuo Horiuchi, Daito (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 0 days.

(21) Appl. No.: 14/456,024

(22) Filed: Aug. 11, 2014

(65) Prior Publication Data

US 2015/0053497 A1 Feb. 26, 2015

(30) Foreign Application Priority Data

Aug. 20, 2013 (JP) ................................ 2013-170778

(51) Int. Cl.
| | | |
|---|---|---|
| *G06F 1/16* | (2006.01) | |
| *H04R 1/34* | (2006.01) | |
| *H04N 5/64* | (2006.01) | |

(52) U.S. Cl.
CPC ............ *G06F 1/1605* (2013.01); *H04N 5/642* (2013.01); *H04R 1/345* (2013.01); *H04R 2499/15* (2013.01)

(58) Field of Classification Search
CPC .... G06F 1/1605; H04N 5/642; H04R 1/345; H04R 2499/15
USPC ........ 181/186, 199, 191; 381/160, 333, 352, 381/387, 388
See application file for complete search history.

(56) References Cited

U.S. PATENT DOCUMENTS

| | | | | |
|---|---|---|---|---|
| 5,822,443 A * | 10/1998 | Kim | ........................ | H04N 5/642 181/152 |
| 6,324,052 B1 * | 11/2001 | Azima | .................. | G06F 1/1616 361/679.23 |
| 6,529,610 B1 * | 3/2003 | Ogawa | .................... | H04N 5/642 348/E5.13 |
| 7,576,983 B2 * | 8/2009 | Yamaguchi | ........... | G06F 1/1688 181/150 |
| 8,737,673 B2 * | 5/2014 | Lee | ......................... | H04R 1/345 381/333 |
| 2004/0190746 A1 * | 9/2004 | Seki | ......................... | H04R 5/02 381/388 |
| 2006/0117623 A1 * | 6/2006 | Watanabe | ............... | F16M 11/00 40/606.15 |
| 2006/0187364 A1 * | 8/2006 | Fukano | ................... | H04N 5/642 348/836 |

(Continued)

FOREIGN PATENT DOCUMENTS

JP 2012-156987 A 8/2012

*Primary Examiner* — Jeremy Luks
(74) *Attorney, Agent, or Firm* — Keating & Bennett, LLP

(57) ABSTRACT

A speaker mounting structure includes a speaker including a sound output surface, a front casing containing a display panel, a rear casing which is installed on a rear of the front casing and houses the speaker such that the sound output surface faces a direction opposite to the direction that the front casing faces, and a sound-reflecting member which is mounted on the rear casing so as face the sound output surface of the speaker and which reflects the sound that is output from the sound output surface toward the front of the front casing.

16 Claims, 13 Drawing Sheets

(56) References Cited

U.S. PATENT DOCUMENTS

| | | | |
|---|---|---|---|
| 2007/0132911 A1* | 6/2007 | Fujiwara | H04M 1/035 349/58 |
| 2009/0116679 A1* | 5/2009 | Kameoka | G06F 1/1605 381/388 |
| 2009/0196440 A1* | 8/2009 | Suzuki | H04S 1/002 381/160 |
| 2010/0272307 A1* | 10/2010 | Okumura | H04N 5/642 381/388 |
| 2010/0290659 A1* | 11/2010 | Tagami | H04R 1/345 381/352 |
| 2010/0310104 A1* | 12/2010 | Hamada | G06F 1/1605 381/333 |
| 2013/0057776 A1* | 3/2013 | Yamaguchi | H04N 5/642 348/731 |
| 2013/0279730 A1 | 10/2013 | Tanaka | |
| 2013/0329927 A1* | 12/2013 | Samarakoon | H04R 1/025 381/333 |
| 2013/0329932 A1* | 12/2013 | Sudo | H04R 1/02 381/361 |
| 2014/0247959 A1* | 9/2014 | Yamanaka | H04R 1/345 381/388 |

\* cited by examiner

FIG.11

| Modes pertaining to sound | Mode of changing sound quality using equalizer | Degree of rotation of sound reflecting members |
|---|---|---|
| Music mode | Emphasize high frequency band and low frequency band | High |
| Cinema mode | Surround | High |
| News/information program mode | Emphasize middle frequency band | Default |
| Late-night mode | Cut low-frequency band and emphasize high frequency | Low |

SPEAKER MOUNTING STRUCTURE AND DISPLAY DEVICE

BACKGROUND OF THE INVENTION

1. Field of the Invention

The present invention relates to a speaker mounting structure and a display device including such a speaker mounting structure.

2. Description of the Related Art

In display devices that have audio output functions such as flat-screen televisions and tablet-style computers, display devices have been known in the past in which speakers are disposed such that the surfaces for outputting audio from the speakers face the rear of the display devices. See, for example, Japanese Patent Application Laid-Open Publication No. 2012-156987.

In such conventional display devices, sound from the speaker does not directly reach users located in front of the display device, but instead reaches the user through a circuitous, indirect path from the rear of the display device.

Generally, the directionality of bass sounds, which have low frequencies, is low, while the directionality of treble sounds, which have high frequencies, is high. For this reason, the low-frequency bass sounds have an easier time reaching the user when sound from the speaker is made to reach the user circuitously or indirectly from the rear of the display device. However, because the directionality of the high-frequency treble sounds is high, less of the sound goes around to the front portion of the display device, which degrades frequency characteristics and decreases sound volume.

SUMMARY OF THE INVENTION

Therefore, it is desirable to improve sound quality in display devices in which the sound output surface of the speaker is disposed so as to face the rear.

Preferred embodiments of the present invention provide a speaker mounting structure and a display device including the speaker mounting structure that achieve improved sound quality despite a sound output surface of a speaker facing rearward.

A speaker mounting structure according to a preferred embodiment of the present invention is preferably installed in a device including a display panel facing in a front direction, and includes a speaker including a sound output surface, a front casing configured to house the display panel, a rear casing fixed to a rear of the front casing and configured to house the speaker such that the sound output surface faces in a rear direction opposite to the front direction in which the front casing faces, and a sound-reflecting member mounted on the rear casing so as to face the sound output surface of the speaker and so as to reflect the sound that is output from the sound output surface toward the front of the front casing.

With of this configuration, sound that is output from the speaker toward the opposite direction of the front casing is reflected toward the front of the front casing by the sound-reflecting member.

As a result, sound that is output from the speaker in the direction opposite of where the user is located is reflected by the sound-reflecting member and reaches the user's location. For this reason, not only bass sounds, which have low directionality, but also treble sounds, which have high directionality, also reach the user.

As a result, bass sounds and treble sounds are relayed to the user simply by mounting the sound-reflecting member on the rear casing, so the sound quality of the sound that reaches the user is improved at low cost when the sound output surface of the speaker is disposed so as to face the rear.

Furthermore, the speaker is housed in a state in which the sound output surface faces a direction of the surface having the device placed thereon and also in which sound is output in a direction inclined with respect to the ground surface, and the sound-reflecting member is rotatable in upward and downward directions within a predetermined angle range.

With this configuration, sound that is output from the sound output surface of the speaker is relayed rearward at an inclination in the downward direction to the sound-reflecting member, and the sound relayed to the sound-reflecting member is relayed to the location of the user, who is in front of the speaker, at a reflection angle according to the degree of rotation in the upward or downward direction of the sound-reflecting member.

Consequently, the direction of reflection in the up-down direction of the sound that is output from the speaker changes by the user changing the degree of rotation of the sound-reflecting member, so the height of the sound that reaches the user's location changes.

As a result, the height of the sound that reaches the user is capable of being changed freely according to the height of the position of the user's ear.

A speaker mounting structure according to a preferred embodiment of the present invention further includes a rotation mechanism that is supplied with power and makes the sound-reflecting member rotate.

With this configuration, because the sound-reflecting member is rotated by electric power, the user does not need to manually rotate the sound-reflecting member, so convenience is increased. It is more convenient, for example, if a control signal is sent from a remote controller to electrically rotate the sound-reflecting member.

A speaker mounting structure according to a preferred embodiment of the present invention further includes a control unit configured or programmed to control the rotation mechanism according to a plurality of modes pertaining to the sound and a storage unit configured to store in advance degrees of rotation of the sound-reflecting member respectively corresponding to the plurality of modes, and the control unit refers to the storage unit to identify one of the degrees of rotation that respectively corresponds to the plurality of modes and controls the rotation mechanism so as to rotate the sound-reflecting member by the degree of rotation thus identified.

With this configuration, the sound-reflecting member is rotated by degrees of rotation that respectively correspond to the plurality of modes pertaining to sound, so sound that is output from the speaker reaches the user's position at an optimal reflection angle according to the specific mode.

An equalizer configured to change the frequency characteristics of a sound signal that is output to the speaker and expresses the sound is further provided. The storage unit also stores in advance modes of changing the sound signal respectively corresponding to the plurality of modes, and the control unit further refers to the storage unit, determines one of the modes of changing that respectively correspond to the plurality of modes, and causes the equalizer to change the frequency characteristics of the sound signal according to the mode of changing thus determined.

With this configuration, the frequency characteristics of sound signals are changed according to the individual ones of the plurality of modes, so angles of rotation of the sound-reflecting member and frequency changes of electrical sound signals are capable of being combined, which makes it possible to change the way sound is heard by the user according to each mode in a more effective manner.

In addition, the sound-reflecting member reflects sound that is output from the sound output surface of the speaker toward the front with the front casing as a reference and also in a direction of the ground surface, a stand configured to mount the speaker mounting structure is further provided, and the stand is provided with a stand base that reflects the sound reflected by the sound-reflecting member toward the front with the front casing as a reference and also in the upward direction with respect to the ground surface.

With this configuration, the sound reflected forward at an inclination in the downward direction by the sound-reflecting member is reflected by the stand base forward at an inclination in the upward direction at the stand base, so sound that is output from the speaker reaches the user's ear more easily.

Furthermore, a display device according to another preferred embodiment of the present invention includes a display panel that displays images and the speaker mounting structure according to any of the various preferred embodiments of the present invention.

With this configuration, because the speaker mounting structure described above is provided, a display device that exhibits the effects described above is provided.

Various preferred embodiments of the present invention make it possible to improve the sound quality of the sound that reaches the user even if it is disposed such that the sound output surface of a speaker faces rearwardly.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 11 is a diagram showing one example of the contents of the storage unit.

DETAILED DESCRIPTION OF THE PREFERRED EMBODIMENTS

Preferred embodiments of the present invention will be described in detail below using drawings. Note that each of the preferred embodiments described below shows a comprehensive or concrete example. The constituent elements, the disposed positions and connection modes of the constituent elements, and so forth indicated in the preferred embodiments below are just examples and do not limit the present invention.

Preferred Embodiment 1

Figure 1:
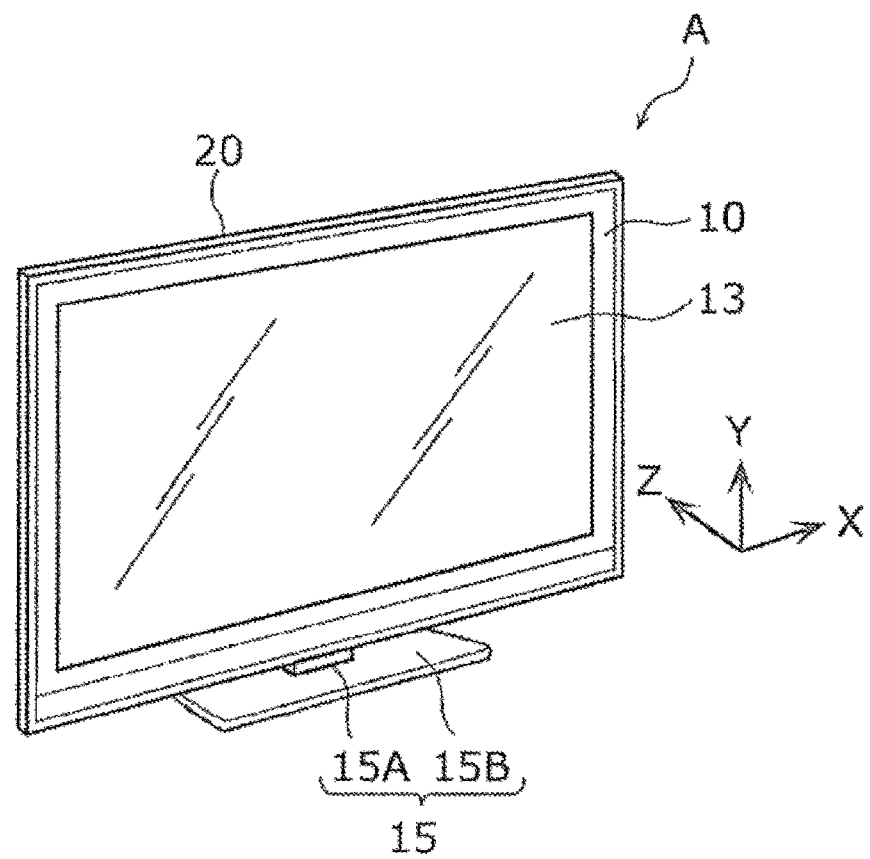
FIG. 1 is a perspective view showing one example of the configuration of the front surface of the display device according to a first preferred embodiment of the present invention.
Figure 2:
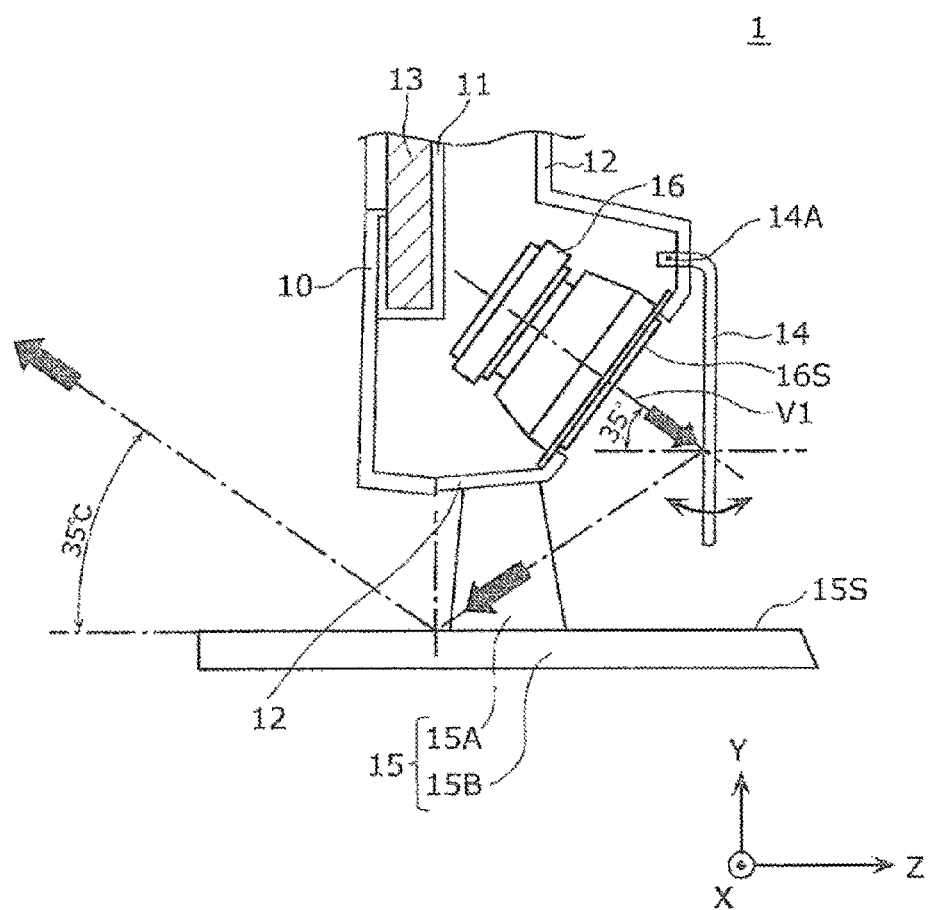
FIG. 2 is a side view of the display device of FIG. 1 as seen from the rightward direction.

FIG. 1 is a perspective view showing one example of the configuration of a front surface of the a display device according to first preferred embodiment of the present invention. FIG. 2 is a side view of the display device of FIG. 1 as seen from the rightward direction. Note that, in FIGS. 1 and 2, the rightward direction is represented by the X-axis direction, the height direction is represented by the Y-axis direction, and the depth direction is represented by the Z-axis direction.

A display device A is equipped with a main body unit and a stand 15 that supports the main body unit 20. The stand 15 is provided with a stand base 15B and a support member 15A that is installed on the stand base 15B so as to be perpendicular or substantially perpendicular to the stand base 15B. The main body unit 20 is mounted on the support member 15A of the stand 15. The stand base 15B is disposed parallel or substantially parallel to a surface that is parallel to the ground, such as a desk.

The main body unit 20 is equipped with a front cabinet 10 defining a front casing. The front cabinet 10 is a frame-shaped member and surrounds the external frame of the display panel (liquid crystal panel, for example) 13. A rear frame 11 is disposed on the back surface of the display panel 13. Furthermore, a rear cover 12 is installed on the back surface of the rear frame 11 as the rear casing.

Two speakers 16 are disposed, preferably symmetrically, left to right in the rear cover 12. Moreover, a sound-reflecting member 14 is attached to the rear cover 12 so as to face the sound output surfaces 16S of the speakers 16. The sound-reflecting member 14 rotates in the upward and downward directions of the main body unit 20, centered on the rotation axis 14A. The main body unit 20 is provided with as many speaker mounting structures 1 according to the first preferred embodiment of the present invention as there are speakers 16 (two, in this example).

Figure 3:
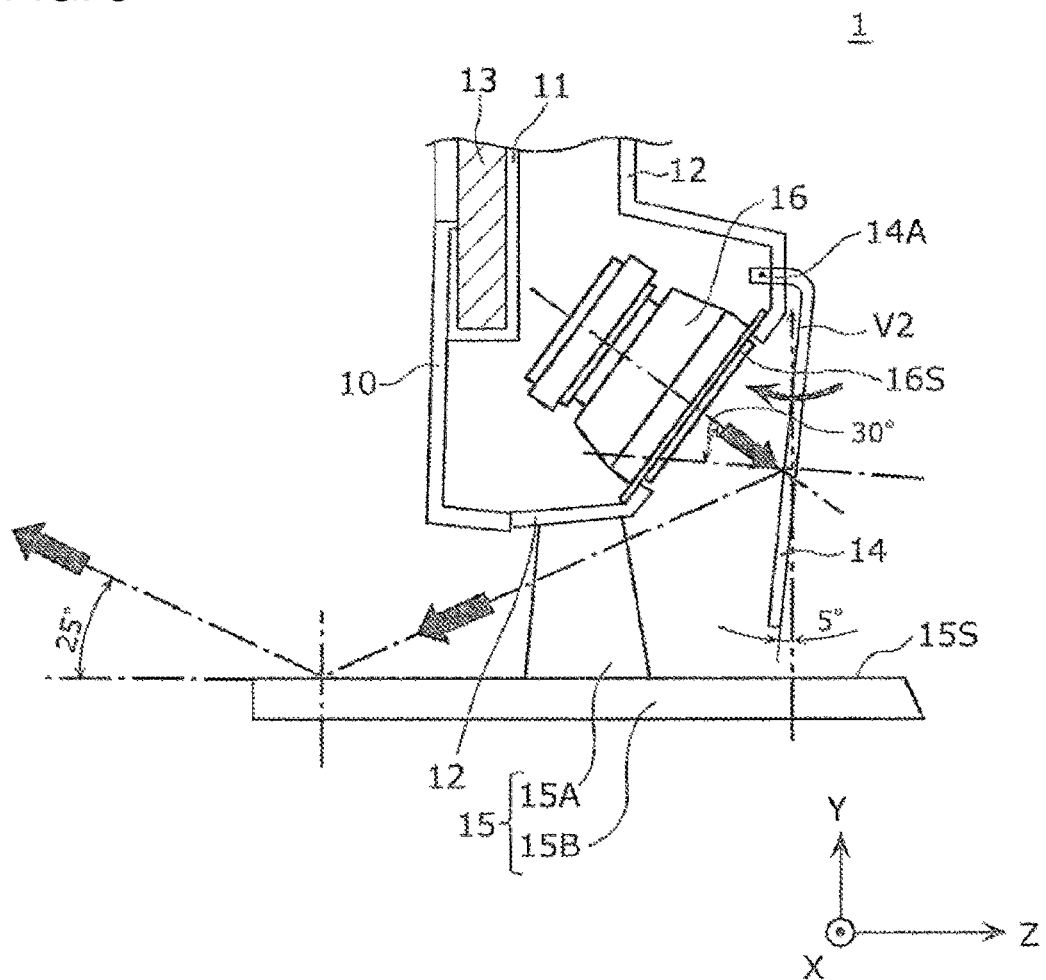
FIG. 3 is a side view showing a state in which the sound-reflecting member is rotated downward in the speaker mounting structure of FIG. 2.

A speaker mounting structure 1 will be described below with reference to FIGS. 2 and 3. FIG. 3 is a side view showing a state in which the sound-reflecting member is rotated downward in the speaker mounting structure of FIG. 2. Note that FIG. 3, just like FIG. 2, also shows a state in which the display device A of FIG. 1 is seen from the rightward direction.

In addition, in FIG. 3 as well, the rightward direction is represented by the X-axis direction, the height direction is represented by the Y-axis direction, and the depth direction is represented by the Z-axis direction.

First, the configuration of the speaker mounting structure will be described using FIGS. 2 and 3.

As shown in FIGS. 2 and 3, the speakers 16 are housed in the interior of the rear cover 12 in a state in which the sound output surfaces 16S of the speakers 16 are inclined downward. To elaborate this, the speakers 16 are housed such that the lines V1 perpendicular to the sound output surfaces 16S of the speakers 16 define a certain angle facing downward (about 35° in this example) with respect to the direction of the surface (ground surface) on which the display device A is placed.

The sound-reflecting member 14 is provided with a stopper (not shown) that stops the rotation of the sound-reflecting member 14 at set angle increments (e.g., about 5°). The sound-reflecting member 14 is configured to be rotated in set angle increments by the stopper.

FIG. 2 shows a state in which the sound-reflecting member 14 is maintained parallel or substantially parallel to the vertical direction. In states like that of FIG. 2, the incident angle of sound from the sound output surfaces 16S toward the sound-reflecting member 14 preferably is about 35°, for example. FIG. 3 shows a state in which the sound-reflecting member 14 preferably is rotated about 5°, for example, downward from the state of FIG. 2. In states like that of FIG. 3, the incident angle of sound from the sound output surfaces 16S toward the sound-reflecting member 14 preferably is about 30°, for example.

At this point, it is assumed that the sound output surfaces 16S of the speakers 16 define angles of about 35°, for example, with respect to the direction of the ground surface, and that the sound-reflecting member 14 is in a state parallel or substantially parallel to the up-down direction as shown in FIG. 2. In this case, the sound that is output from the sound output surfaces 16S of the speakers 16 travels toward the sound-reflecting member 14 at an incident angle of about 35° with respect to the ground surface. Sound is thereby reflected at the sound-reflecting member 14 at a reflection angle of about 35°, for example.

The sound reflected by the sound-reflecting member 14 hits the surface 15S of the stand base 15B at an incident angle of preferably about 35°, for example. The surface 15S of the stand base 15B thereafter reflects sound at a reflection angle of preferably about 35°, for example.

Furthermore, as shown in FIG. 3, sound from the sound output surfaces 16S of the speakers 16 hits the sound-reflecting member 14 at an incident angle of about 30° when the sound-reflecting member 14 is rotated about 5° downward from the up-down direction as shown in FIG. 3, for example. The sound-reflecting member 14 thus reflects sound at a reflection angle of about 30°, for example.

The sound reflected by the sound-reflecting member 14 hits the surface 15S of the stand base 15B at a downward incident angle of about 25°, for example, relative to the ground surface. The surface 15S of the stand base 15B thereafter reflects sound at an upward reflection angle of about 25°, for example, relative to the ground surface.

With this configuration, the sound hitting the sound-reflecting member 14 from the sound output surfaces 16S of the speakers 16 is reflected forward at an inclination angle in the downward direction by the sound-reflecting member 14 and further reflected forward at an inclination angle in the upward direction by the surface 15S of the stand base 15B.

Because of this, not only treble sounds with low directionality but also treble sounds with high directionality are also reflected by the sound-reflecting member 14 and thus relayed to the user, so the quality of the sound that reaches the user is improved at low cost if the sound output surfaces 16S of the speakers 16 are disposed so as to face the rear portion of the display device A.

Moreover, as shown in FIG. 3, because sound is reflected by the surface of the stand base 15B at a reflection angle according to the degree of rotation of the sound-reflecting member 14, the user can make it easy for reflected sound generated by the surface of the stand base 15B to reach the ear of this user according to the position of the ear by changing the degree of rotation of the sound-reflecting member 14, so this is advantageous.

Preferred Embodiment 2

Figure 4:
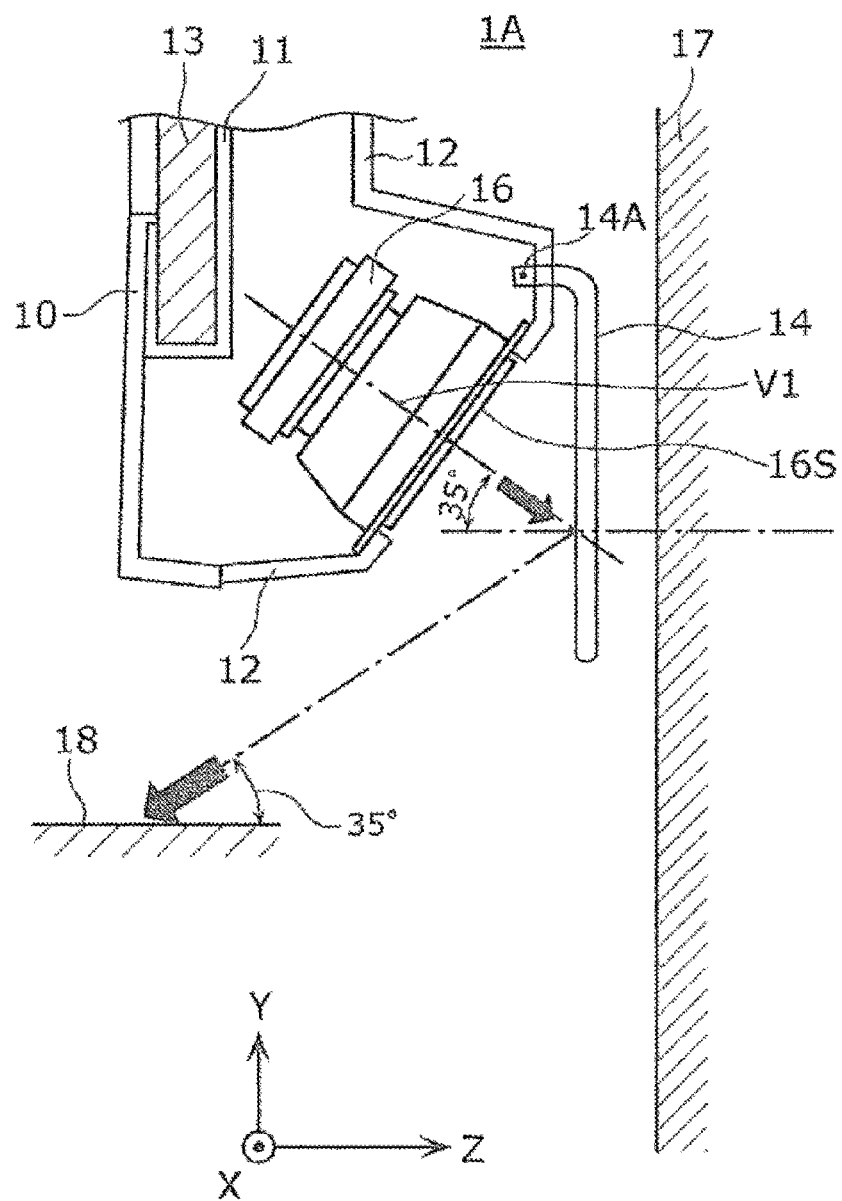
FIG. 4 is a side view showing one example of the configuration of the speaker mounting structure according to a second preferred embodiment of the present invention.
Figure 5:
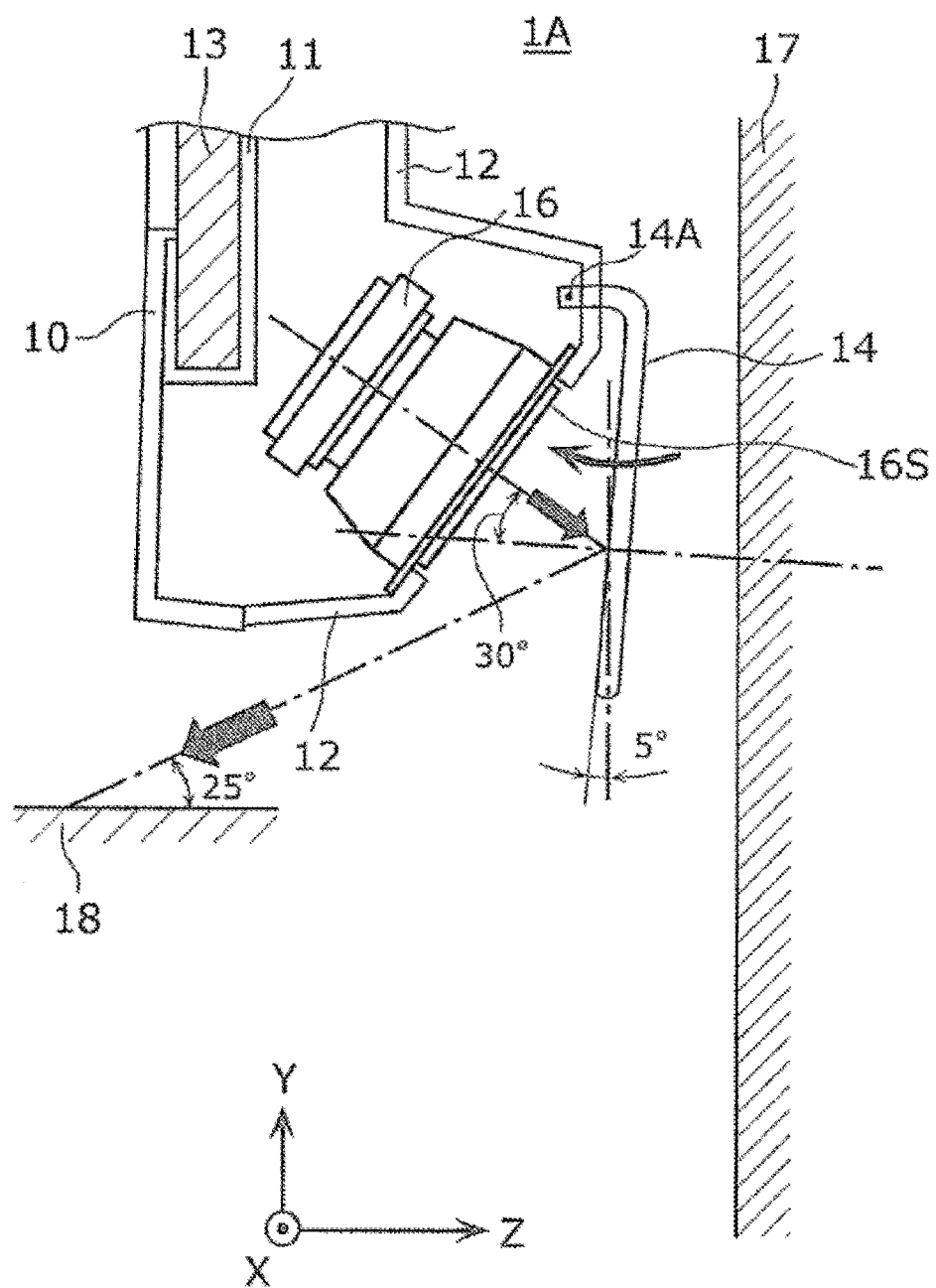
FIG. 5 is a side view showing a state in which the sound-reflecting member is rotated downward in the speaker mounting structure of FIG. 4.
Figure 6:
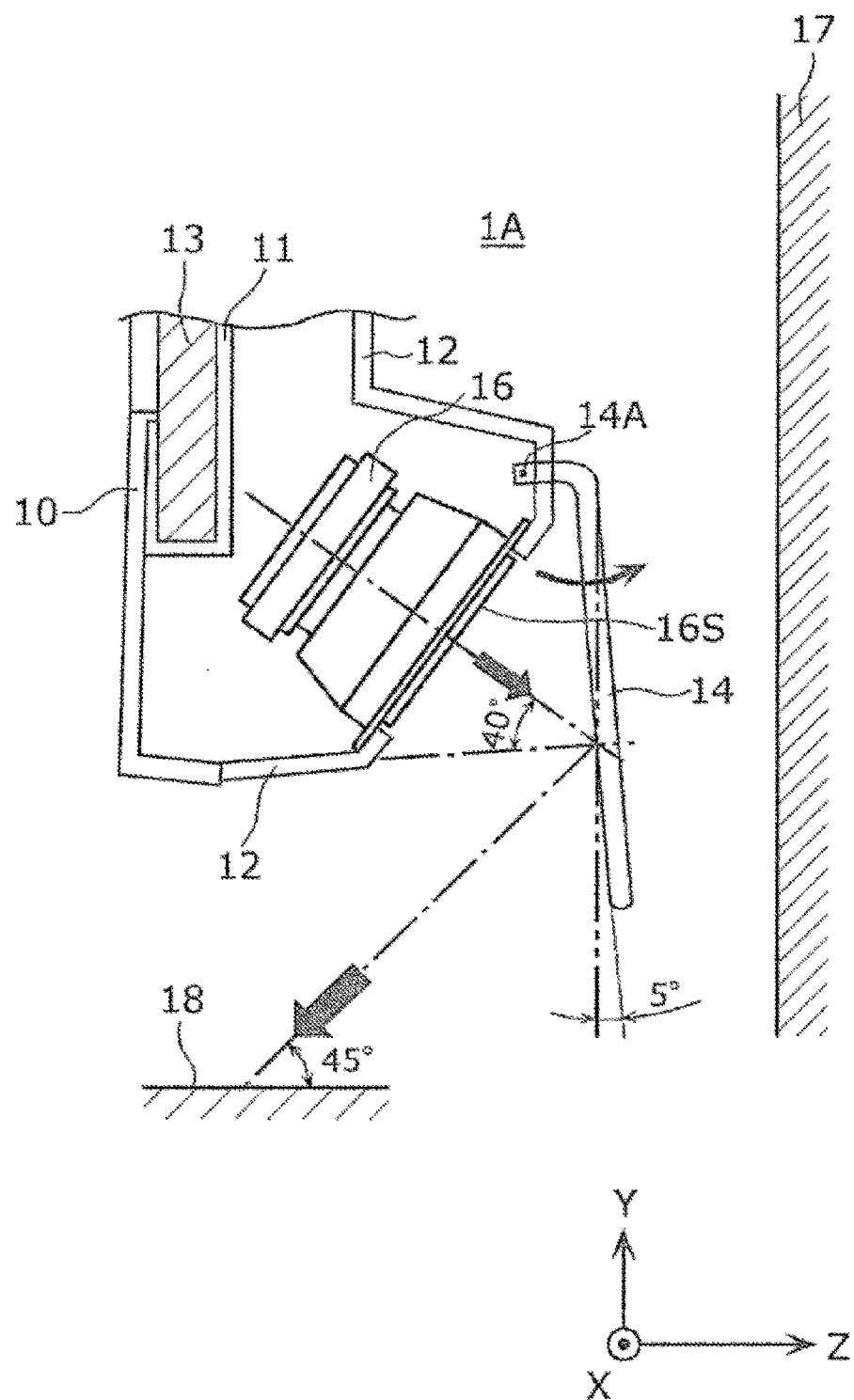
FIG. 6 is a side view showing a state in which the sound-reflecting member is rotated upward in the speaker mounting structure of FIG. 4.

FIG. 4 is a side view showing one example of the configuration of the speaker mounting structure according to a second preferred embodiment of the present invention. FIG. 5 is a side view showing a state in which the sound-reflecting member is rotated downward in the speaker mounting structure of FIG. 4. FIG. 6 is a side view showing a state in which the sound-reflecting member is rotated upward in the speaker mounting structure of FIG. 4. Note that FIGS. 4 through 6 show a state in which the display device A of FIG. 1 is seen from the rightward direction.

In addition, in FIGS. 4 through 6, the rightward direction is represented by the X-axis direction, the height direction is represented by the Y-axis direction, and the depth direction is represented by the Z-axis direction. In FIGS. 4 through 6, furthermore, the same symbols are assigned to the constituent elements already shown in FIGS. 2 and 3, and the description thereof will be omitted.

The speaker mounting structure 1A in FIGS. 4 through 6 is different from the speaker mounting structure 1 in that it is mounted on a wall 17 so as to be parallel or substantially parallel to the wall 17 instead of the stand base 15B. The remaining configuration preferably is the same as that of the speaker mounting structure 1, so the description thereof will be omitted.

When the speaker mounting structure 1A is mounted on the wall 17 as shown in FIGS. 4 through 6, sound that is output from the sound output surfaces 16S of the speakers 16 hits the sound-reflecting member 14 and then is reflected toward a ground surface 18 at an reflection angle that is the same as the incident angle.

Generally, when the display device A is used while mounted on the wall 17, the user will often be looking at images on the display panel 13 of the display device A from a direction diagonally below the display panel 13. With this configuration, sound from the speakers 16 is reflected forward at an inclination in the downward direction, so the sound reaches the user's ear more easily.

As a result, an effect similar to that described above is exhibited even when the display device A is used while mounted on the wall 17.

In particular, when the sound-reflecting member 14 is rotated upward as shown in FIG. 6, the reflection angle of sound reflected forward by the sound-reflecting member 14 is larger (for example, about 45° in this case) than when the sound-reflecting member 14 is rotated downward as shown in FIG. 5. As a result, sound is relayed to the ground surface 18 at a larger incident angle than when the sound-reflecting member 14 is rotated downward.

Thus, sound reaches farther below the display device A by rotating the sound-reflecting member 14 upward, so in cases where the display device A is installed in a high location, such as a storefront, sound reaches the user's ear more easily.

Moreover, when the sound-reflecting member 14 is not provided, sound from the speakers 16 is reflected by the wall 17, and the reflected sound is relayed to the user's location as incident sound. However, there are cases in which the materials, surfacing, and the like of the wall 17 change the sound quality of the incident sound from the wall 17.

Because the sound-reflecting member 14 is disposed in front of the wall 17 according to the second preferred embodiment, sound does not hit the wall 17. Accordingly, sound of a constant sound quality is relayed to the user regardless of the state of the materials, surfacing, and the like of the wall 17.

Preferred Embodiment 3

Figure 7:
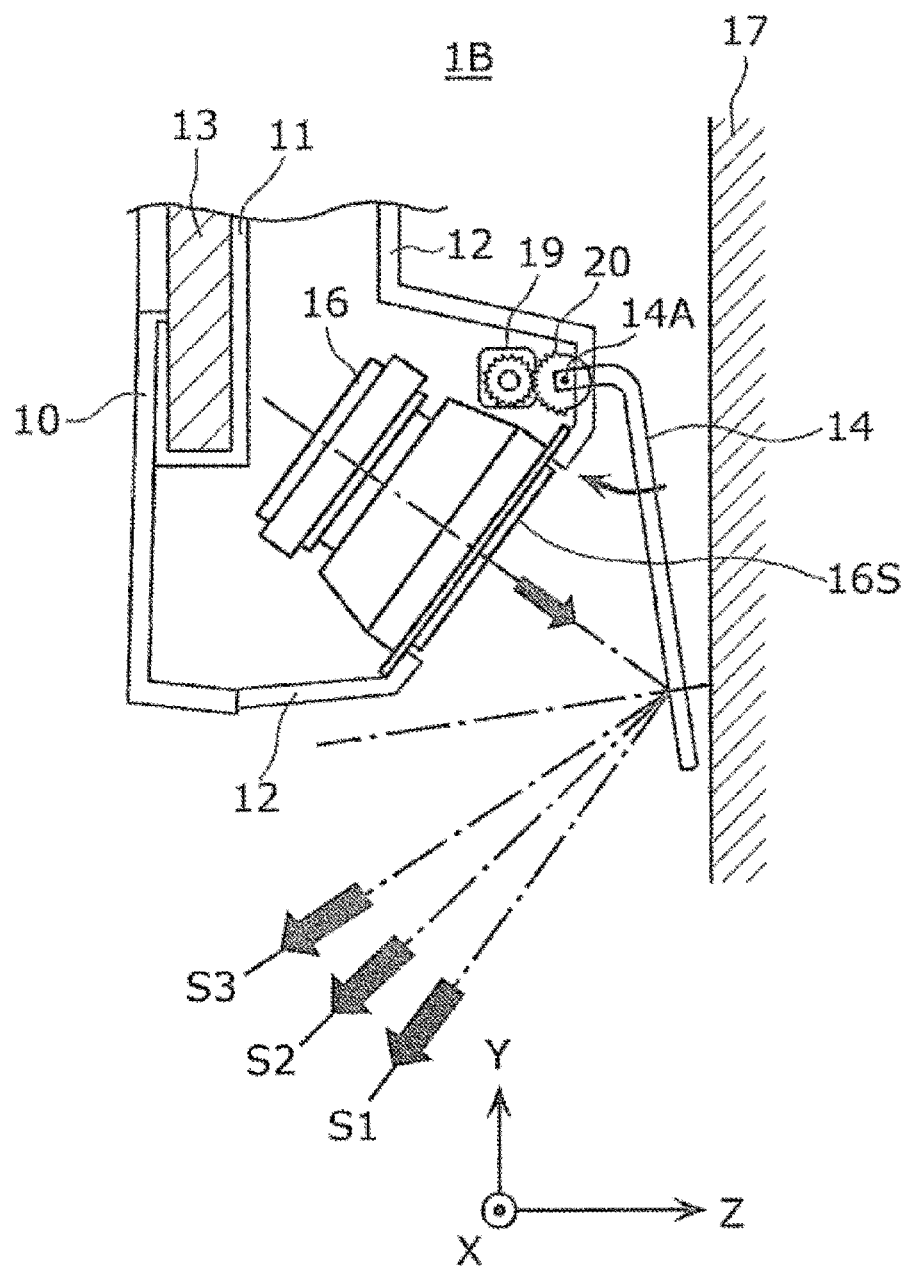
FIG. 7 is a side view showing one example of the configuration of the speaker mounting structure according to a third preferred embodiment of the present invention.
Figure 8:
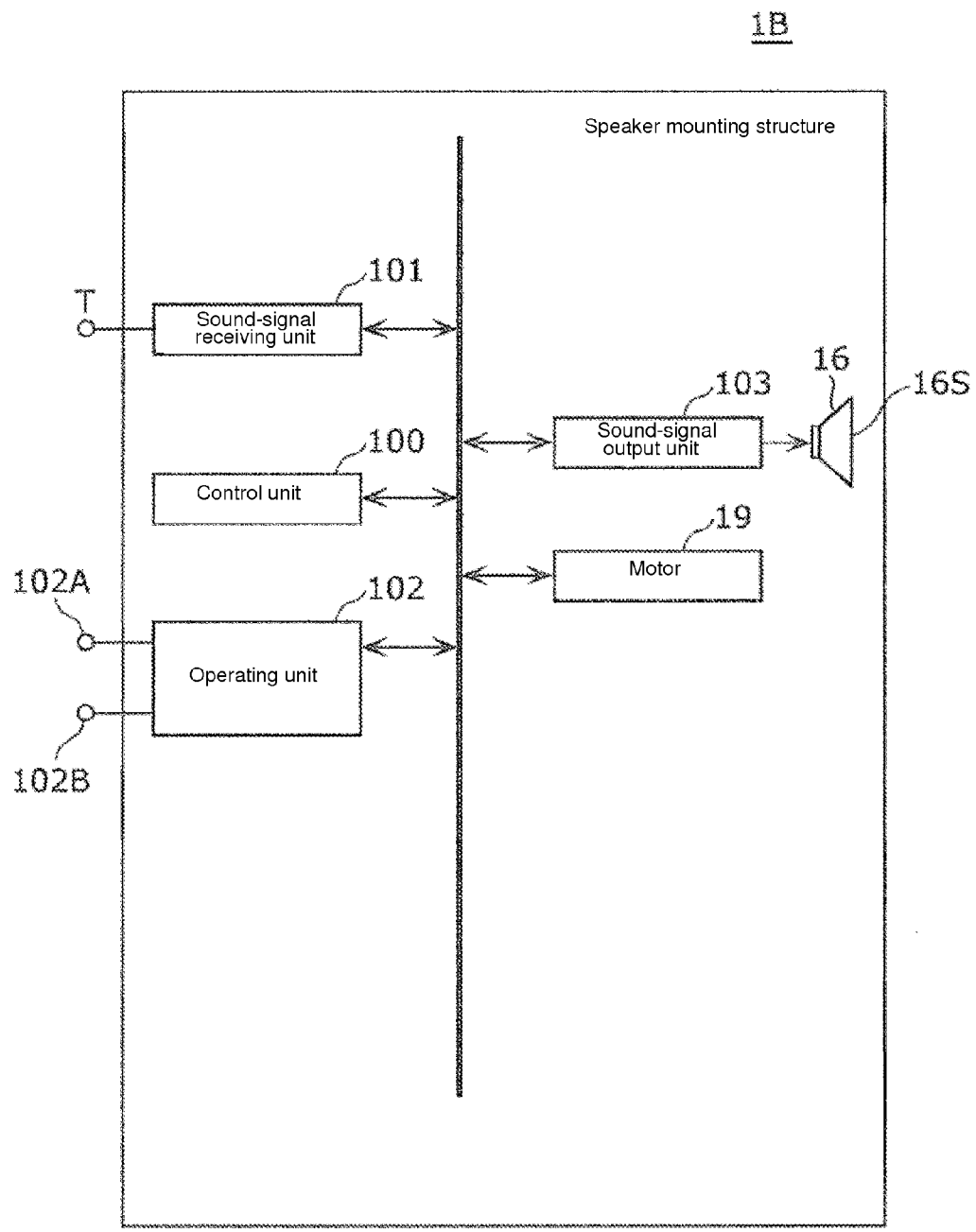
FIG. 8 is a block diagram showing one example of the functional configuration of the speaker mounting structure of FIG. 7.

FIG. 7 is a side view showing one example of the configuration of the speaker mounting structure according to a third preferred embodiment of the present invention. FIG. 8 is a block diagram showing one example of the functional configuration of the speaker mounting structure of FIG. 7.

The speaker mounting structure 1B is equipped with a motor 19 that defines and serves as a drive source to make the sound-reflecting member 14 rotate and a gear mechanism 20 that converts the rotation of the motor 19 into rotation of the sound-reflecting member 14 in the upward and downward directions. Note that the motor 19 and the gear mechanism 20 constitute the rotation mechanism according to a preferred embodiment of the present invention.

As shown in FIG. 8, the speaker mounting structure 1B preferably includes a control unit 100, a sound-signal receiving unit 101, an operating unit 102, a sound-signal output unit 103, a speaker 16, and the motor 19.

The control unit 100 is configured or programmed to comprehensively control the speaker mounting structure 1B. The control unit 100 preferably includes a central processing unit (CPU), random access memory (RAM), read-only memory (ROM), and the like and realizes its functions by the CPU executing specified control programs.

The sound-signal receiving unit 101 is configured to receive sound signals that are sent via a terminal T over a sound signal line (not shown) and to produce sound. The operating unit 102 is provided with rotation switches 102A and 102B. The user operates the rotation switch 102A to rotate the sound-reflecting member 14 in the upward direction and operates the rotation switch 102B to rotate the sound-reflecting member 14 in the downward direction.

The sound-signal output unit 103 is configured to output a sound signal toward the speaker 16. The speaker 16 is configured to receive the sound signal and output the sound expressed by this sound signal from the sound output surface 16S. The motor 19 is configured to define and serve as the drive source for the sound-reflecting member 14 and relay rotation force to the gear mechanism 20.

With this configuration, when the user operates the rotation switches 102A and 102B, the control unit 100 drives the motor 19 and makes the sound-reflecting member 14 rotate in the upward and downward directions. As a result, the angle of reflection of the sound at the sound-reflecting member 14 is changed.

For example, as shown in FIG. 7, the sound reflected by the sound-reflecting member 14 changes in the order from S1 through S3 from the state in which the sound-reflecting member 14 is open to the state in which it is closed.

Because of this, the user rotates the sound-reflecting member 14 to the position where a sound agreeable to the user is obtained by operating the rotation switches 102A and 102 B, so this is advantageous and convenient.

Note that the convenience is increased even further if the sound-reflecting member 14 is made to rotate by sending control signals from a remote controller rather than by operating the rotation switches 102A and 102B.

Preferred Embodiment 4

Figure 9:
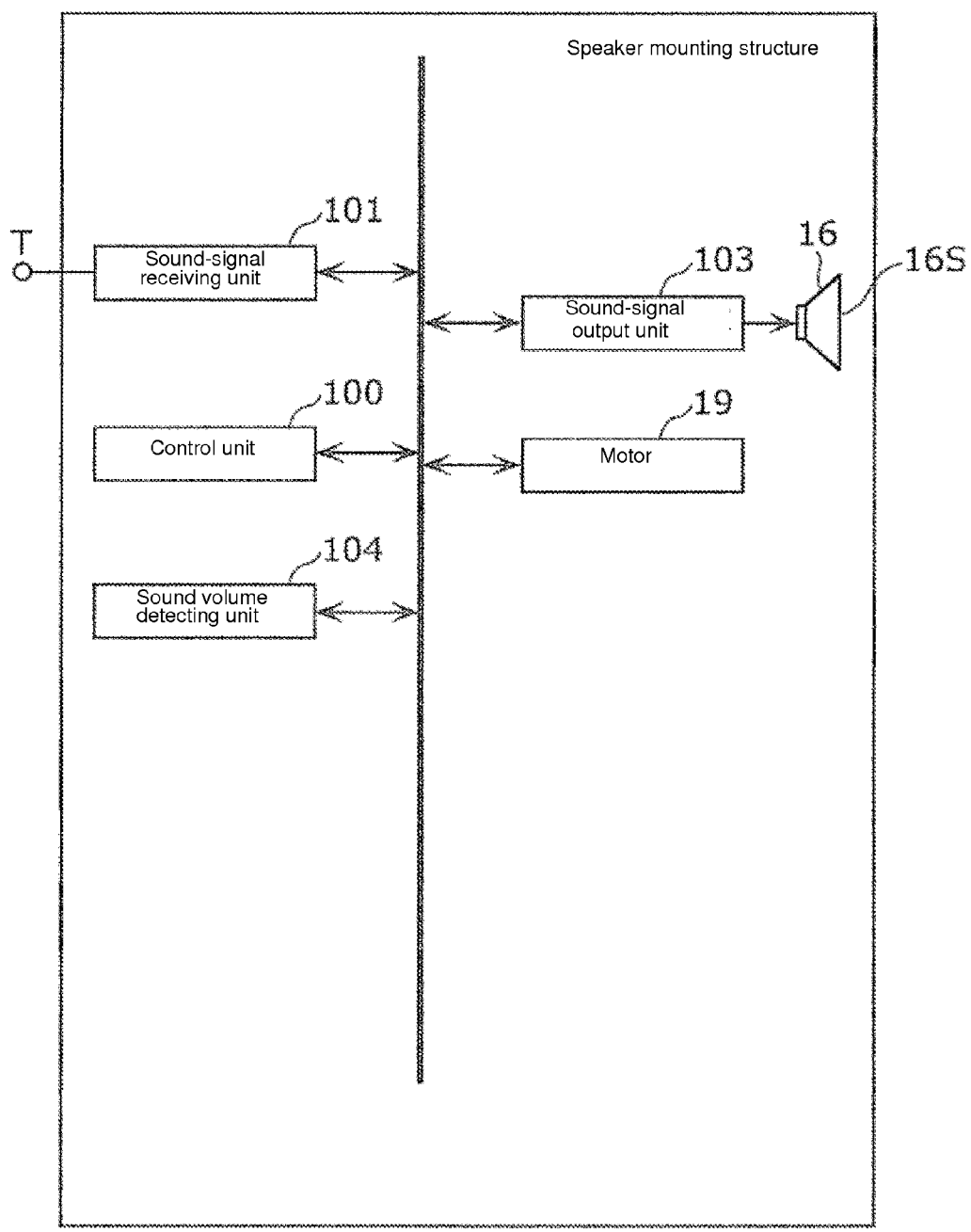
FIG. 9 is a block diagram showing one example of the functional configuration of the speaker mounting structure according to a fourth preferred embodiment of the present invention.

FIG. 9 is a block diagram showing one example of the functional configuration of the speaker mounting structure according to a fourth preferred embodiment of the present invention. Note that the external appearance is similar to that of the speaker mounting structure 1B described previously. With this configuration, a sound-volume detecting unit 104 is provided in place of the operating unit 102 of the speaker mounting structure 1B.

The sound-volume detecting unit 104 detects the volume of sound expressed by the sound signal by detecting the amplitude of the sound signal received by the sound-signal receiving unit 101. The control unit 100 controls the motor 19 based on the detection results of the sound-volume detecting unit 104.

With this configuration, the greater the sound volume that the sound-volume detecting unit 104 detects, the more the control unit 100 drives the motor 19 and makes the sound-reflecting member 14 rotate upward. Then, an aperture 21 (see FIGS. 12 and 13) between the rear cover 12 and the sound-reflecting member 14 becomes wider, thus increasing the expansiveness of the sound.

Preferred Embodiment 5

Figure 10:
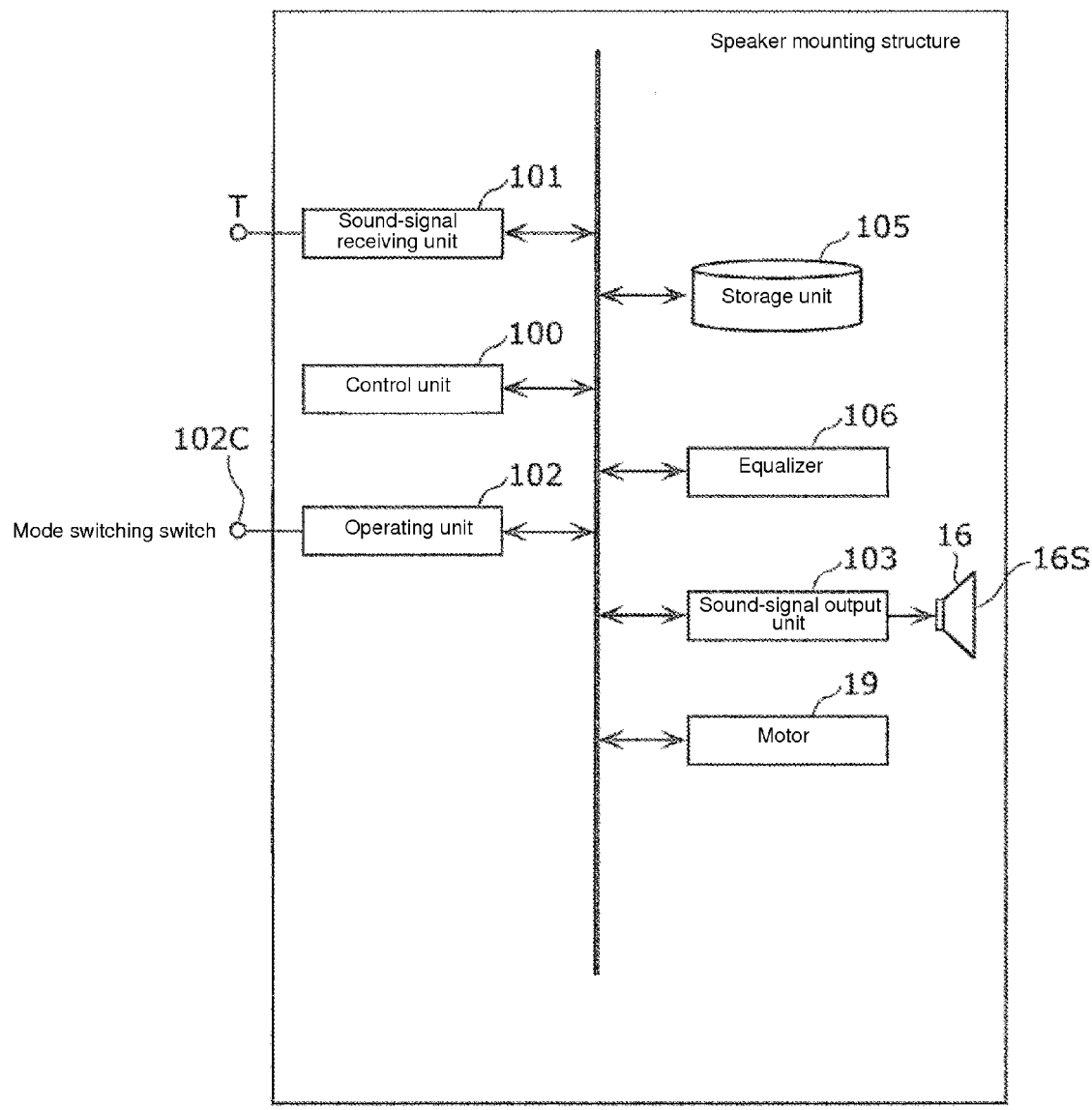
FIG. 10 is a block diagram showing one example of the functional configuration of the speaker mounting structure according to a fifth preferred embodiment of the present invention.

FIG. 10 is a block diagram showing one example of the functional configuration of the speaker mounting structure according to a fifth preferred embodiment of the present invention. FIG. 11 is a diagram showing one example of the contents of the storage unit 105. Note that the external appearance of the speaker mounting structure 1D is similar to that of the speaker mounting structure 1B described previously.

In the speaker mounting structure 1D, a mode switching switch 102C is provided instead of the rotation switches 102A and 102B in the speaker mounting structure 1B, and the storage unit 105 and an equalizer 106 are added.

The control unit 100 is configured or programmed to have a plurality of modes pertaining to sound. For example, the control unit 100 has a "music mode," a "cinema mode," a "news/information program mode," and a "late-night mode."

The mode switching switch 102C switches the mode of the control unit 100 when operated by the user.

The storage unit 105 is configured from ROM, RAM, and the like, for example, and includes a processing table 150A that expresses processes that respectively correspond to the plurality of modes. Note that when the storage unit 105 is configured from RAM, the contents of processes that correspond to modes are rewritten as the user desires.

As shown in FIG. 11, a "Mode of changing sound quality using equalizer 106" 151 and a "Degree of rotation of sound-reflecting member 14" 152 are stored in advance in the processing table 150A corresponding to each of "Modes pertaining to sound" 150.

The equalizer 106 is configured to change the frequency characteristics of the sound signals received by the sound-signal receiving unit 101.

Figure 12:
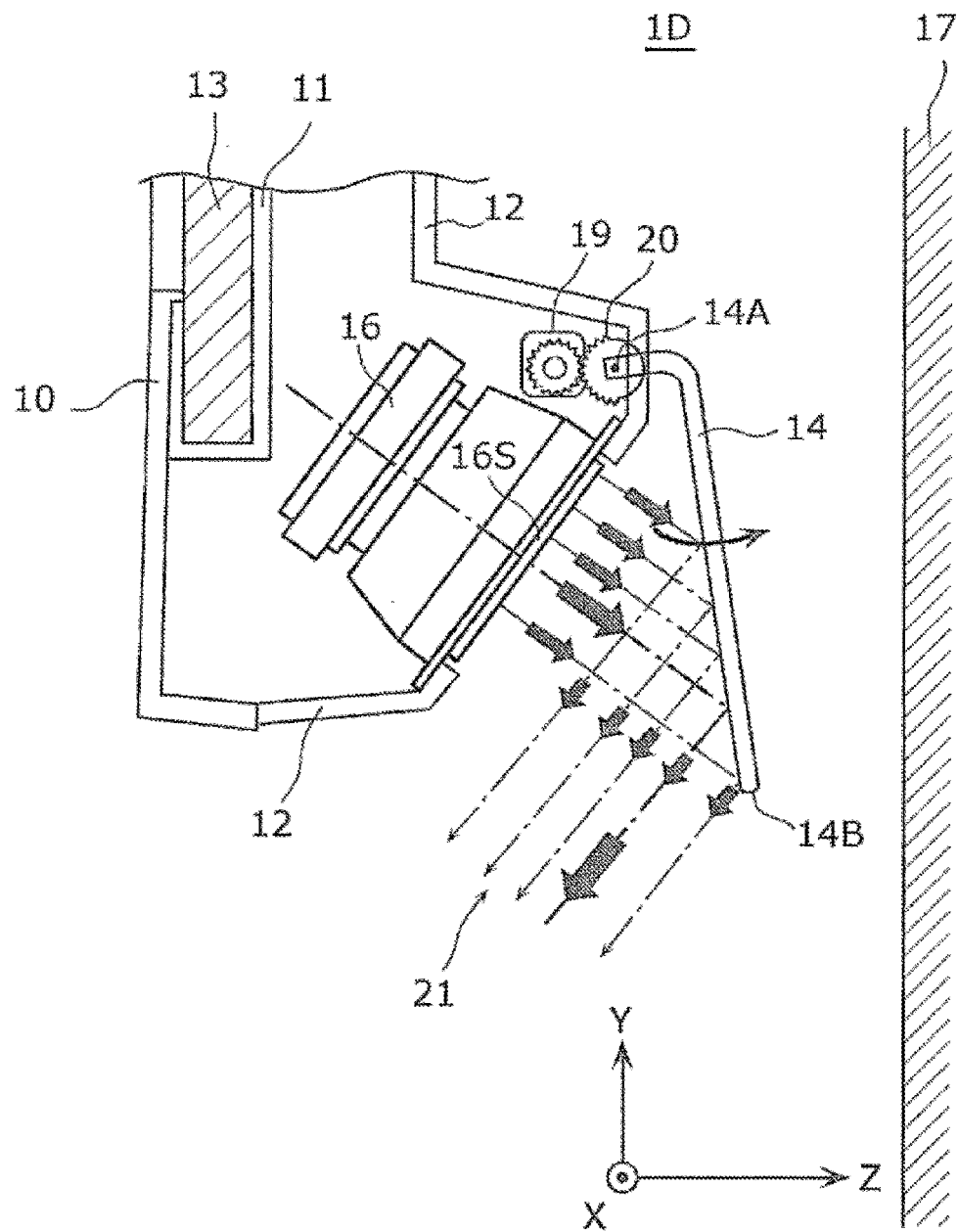
FIG. 12 is a side view of the speaker mounting structure when the control unit is in a music mode.
Figure 13:
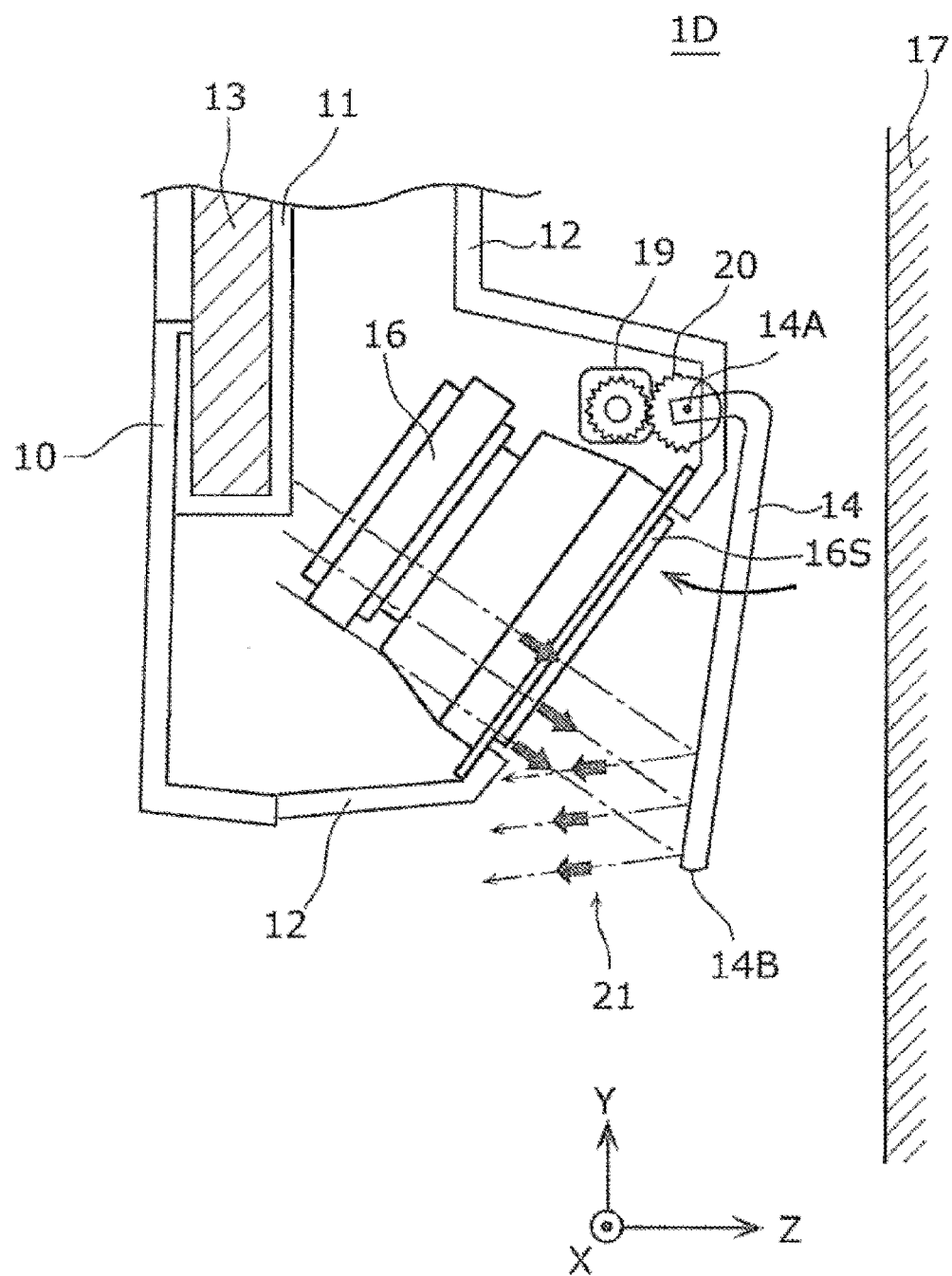
FIG. 13 is a side view of the speaker mounting structure when the control unit is in a late-night mode.

FIG. 12 is a side view of the speaker mounting structure 1D when the control unit 100 is in music mode. FIG. 13 is a side view of the speaker mounting structure 1D when the control unit 100 is in late-night mode.

The control unit 100 runs the mode determined by the operation of the mode switching switch 102C. At this time, the control unit 100 refers to the processing table 150A and runs processing according to this mode. That is, the control unit 100 acquires the "Mode of changing sound quality using equalizer 106" and the "Degree of rotation of sound-reflecting member 14" and runs processing according to the information thereof.

When the control unit 100 is in music mode, the motor 19 rotates the sound-reflecting member 14 until it is completely open. Then, the aperture 21 near the bottom edge 14B of the sound-reflecting member 14 becomes large.

In addition, the control unit 100 emphasizes the high-frequency band and low-frequency band of the sound signal using the equalizer 106.

Consequently, large amounts of sound with the bass and treble emphasized are relayed to the user's location, thus increasing the expansiveness of the sound for the user, which in turn makes listening to music more enjoyable.

When the control unit 100 is in late-night mode, the motor 19 rotates the sound-reflecting member 14 until it is completely closed. Then, the aperture 21 near the bottom edge 14B of the sound-reflecting member 14 becomes small.

Furthermore, the control unit 100 cuts the low-frequency band of the sound signal using the equalizer 106 while also emphasizing the high-frequency band.

It thus cuts out base sounds that have low directionality and are likely to reverberate nearby and emphasizes treble sounds that have high directionality and are unlikely to reverberate nearby before relaying them to the user's location. The result is optimal for viewing and listening to late-night broadcasts.

When the control unit 100 is in cinema mode, the motor 19 rotates the sound-reflecting member 14 until it is completely open. Then, the aperture 21 near the bottom edge 14B of the sound-reflecting member 14 becomes large.

Moreover, the control unit 100 uses the equalizer 106 to generate a surround signal from the sound signal.

Surround sound is thus relayed to the user's location, thus making the viewing of and listening to movies more enjoyable.

When the control unit 100 is in news/information program mode, the motor 19 rotates the sound-reflecting member 14 such that its rotation angle is the default angle of rotation. Note that an example of the default angle of rotation is an angle of rotation that makes the sound-reflecting member 14 parallel or substantially parallel to the up-down direction as shown in FIG. 2, i.e., 0° with respect to the up-down direction. In addition, the control unit 100 emphasizes the middle-frequency band using the equalizer.

Because human voices are generally in the middle-frequency band, it becomes easier to hear human voices even at low volume. The result is optimal for viewing and listening to news or information programs that have a lot of human voice.

With the present preferred embodiment, the middle-frequency band preferably was uniformly emphasized for News/Information Program Mode. However, it is also possible to newly install the sound-volume detecting unit 104 shown in FIG. 9 and to rotate the sound-reflecting member 14 more in the direction that widens the aperture 21 the greater that the sound signal amplitude received by the sound-signal receiving unit 101 becomes.

In addition, with the preferred embodiments described above, the speaker mounting structures 1, 1A, 1B, 1C, and 1D were preferably installed in the display device A, but the present invention is not limited to these examples. Various preferred embodiments of the present invention are applicable to the entire range of devices that dispose the speaker 16 such that the sound output surface 16S faces the back surface direction as seen from the user.

The speaker mounting structures and display devices according to of the present invention were described above based on preferred embodiments, but the present invention is in no way limited to these preferred embodiments. Applications of all manner of variations to the preferred embodiments and configurations resulting from combining constituent elements in different preferred embodiments are also contained within the scope of the present invention so long as they do not depart from the gist of the present invention.

Various preferred embodiments of the present invention preferably are applied, for example, to display devices or the like such as flat-screen televisions.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A display device comprising:
a display panel;
a speaker including a sound output surface that outputs sound;
a front casing that houses the display panel;
a rear casing which is installed on a rear of the front casing and which houses the speaker; and
a sound-reflecting member that reflects sound output from the speaker and has a flat surface; wherein
the sound output surface of the speaker faces in a rearward direction with respect to the display device and is inclined at a first angle with respect to a display surface of the display panel; and
the flat surface of the sound-reflecting member is inclined at a second angle with respect to the sound output surface of the speaker.
2. The display device according to claim 1, wherein
the sound output surface of the speaker is inclined with respect to a ground surface; and
the sound-reflecting member is capable of being rotated within a predetermined angle range.
3. The display device according to claim 2, further comprising a rotation mechanism that causes the sound-reflecting member rotate.
4. The display device according to claim 3, further comprising:
a controller configured or programmed to control the rotation mechanism according to a plurality of modes pertaining to the sound; and
a storage unit that stores in advance degrees of rotation of the sound-reflecting member respectively corresponding to the plurality of modes; wherein
the controller is configured or programmed to refer to the storage unit to identify one of the degrees of rotation that respectively correspond to the plurality of modes and to control the rotation mechanism to rotate the sound-reflecting member by the identified one of the degrees of rotation.

5. The display device according to claim 4, further comprising:
an equalizer that changes frequency characteristics of a sound signal that is output to the speaker and expresses the sound; wherein
the storage unit stores, in advance, modes of changing the sound signal respectively corresponding to the plurality of modes; and
the controller is configured or programmed to refer to the storage unit, determine one of the modes of changing that respectively correspond to the plurality of modes, and causes the equalizer to change the frequency characteristics of the sound signal according to the determined one of the modes of changing.

6. The display device according to claim 1, further comprising:
a stand; wherein
the sound-reflecting member reflects sound that is output from the sound output surface of the speaker toward the front with the front casing as a reference and also in a direction of the ground surface; and
the stand includes a stand base that reflects the sound reflected by the sound-reflecting member toward the front with the front casing as a reference and also in an upward direction with respect to a ground surface.

7. The display device according to claim 1, wherein the sound output surface of the speaker is inclined downward.

8. The display device according to claim 1, wherein sound hitting the sound-reflecting member from the sound output surface of the speaker is reflected forward at an inclination angle in a downward direction by the sound-reflecting member.

9. The display device according to claim 6, wherein sound hitting the sound-reflecting member from the sound output surface of the speaker is reflected forward at an inclination angle in an upward direction by a surface of the stand base.

10. The display device according to claim 1, wherein the display device is capable of being mounted on a wall.

11. The display device according to claim 2, wherein a reflection angle of sound from the sound output surface of the speaker reflecting off the sound-reflecting member changes according to a rotation of the sound-reflecting member.

12. The display device according to claim 2, further comprising a motor and a gear mechanism that cause the sound-reflecting member to rotate.

13. The display device according to claim 2, further comprising a rotation switch that allows a user to cause the sound-reflecting member to rotate.

14. The display device according to claim 2, further comprising a sound-volume detecting unit that detects a volume of sound expressed by the sound signal by detecting an amplitude of the sound signal.

15. The display device according to claim 14, further comprising a controller configured or programmed to control rotation of the sound-reflecting member based on the detection results of the sound-volume detecting unit.

16. The display device according to claim 4, wherein the plurality of modes includes at least one of a music mode, a cinema mode, a news/information program mode, and a late-night mode.

* * * * *